(12) United States Patent
Boorse et al.

(10) Patent No.: US 8,544,260 B2
(45) Date of Patent: Oct. 1, 2013

(54) EMISSIONS TREATMENT SYSTEMS AND METHODS WITH CATALYZED SCR FILTER AND DOWNSTREAM SCR CATALYST

(75) Inventors: R. Samuel Boorse, Skillman, NJ (US); Kenneth E. Voss, Somerville, NJ (US); Martin Dieterle, Jersey City, NJ (US)

(73) Assignee: BASF Corporation, Florham Park, NJ (US)

( * ) Notice: Subject to any disclaimer, the term of this patent is extended or adjusted under 35 U.S.C. 154(b) by 504 days.

(21) Appl. No.: 12/643,621

(22) Filed: Dec. 21, 2009

(65) Prior Publication Data

US 2010/0180580 A1 Jul. 22, 2010

Related U.S. Application Data

(60) Provisional application No. 61/140,731, filed on Dec. 24, 2008.

(51) Int. Cl.
*F01N 3/10* (2006.01)
*F01N 3/00* (2006.01)

(52) U.S. Cl.
USPC .................. 60/299; 60/273; 60/297; 60/303

(58) Field of Classification Search
None
See application file for complete search history.

(56) References Cited

U.S. PATENT DOCUMENTS

| | | | |
|---|---|---|---|
| 4,329,162 A | 5/1982 | Pitcher, Jr. | |
| 4,961,917 A * | 10/1990 | Byrne | 423/239.2 |
| 5,100,632 A | 3/1992 | Dettling | |
| 5,120,695 A | 6/1992 | Blumrich et al. | |
| 5,462,907 A | 10/1995 | Farrauto et al. | |
| 5,491,120 A | 2/1996 | Voss et al. | |
| 2002/0127163 A1 | 9/2002 | Chen et al. | |
| 2004/0098980 A1 | 5/2004 | Montreuil et al. | |
| 2006/0039843 A1* | 2/2006 | Patchett et al. | 423/239.1 |
| 2006/0179825 A1 | 8/2006 | Hu et al. | |
| 2008/0085231 A1 | 4/2008 | Vitse et al. | |
| 2008/0127638 A1 | 6/2008 | Vaarkamp et al. | |

FOREIGN PATENT DOCUMENTS

WO WO-99/39809 A1 8/1999

OTHER PUBLICATIONS

PCT International Search Report; dated Aug. 2, 2010.
Non-Final Office Action in U.S. Appl. No. 12/765,441, dated Mar. 13, 2012, 21 pgs.

* cited by examiner

*Primary Examiner* — Patrick Ryan
*Assistant Examiner* — Sarah A Slifka
(74) *Attorney, Agent, or Firm* — Melanie L. Brown

(57) ABSTRACT

Emissions treatment systems and methods for treating an engine exhaust gas stream containing $NO_x$ and particulate matter are disclosed including a particulate filter comprising a first SCR catalyst for $NO_x$ conversion a second SCR catalyst for $NO_x$ conversion on a substrate disposed downstream of the particulate filter. The system $NO_x$ conversion and the system back pressure increase lie within a targeted operational window.

32 Claims, 4 Drawing Sheets

EMISSIONS TREATMENT SYSTEMS AND METHODS WITH CATALYZED SCR FILTER AND DOWNSTREAM SCR CATALYST

CROSS-REFERENCE TO RELATED APPLICATIONS

This application claims the benefit of priority under 35 U.S.C. §119(e) to U.S. Provisional Application Ser. No. 61/140,731, filed Dec. 24, 2008, which is incorporated herein by reference.

BACKGROUND

The present invention relates to a systems and methods for treating gaseous emissions. In a specific embodiment, the system includes a particulate filter coated with a least a first catalyst effective to promote selective catalytic reduction ("SCR") of $NO_x$ by a reductant, and a substrate coated with at least a second SCR catalyst.

Diesel engine exhaust is a heterogeneous mixture which contains not only gaseous emissions such as carbon monoxide (CO), unburned hydrocarbons ("HC") and nitrogen oxides ("$NO_x$"), but also condensed phase materials (liquids and solids) which constitute the so-called particulates or particulate matter. Often, catalyst compositions and substrates on which the compositions are disposed are provided in diesel engine exhaust systems to convert certain or all of these exhaust components to innocuous components. For example, diesel exhaust systems can contain one or more of a diesel oxidation catalyst, a soot filter and a catalyst for the reduction of $NO_x$.

Oxidation catalysts that contain platinum group metals, base metals and combinations thereof are known to facilitate the treatment of diesel engine exhaust by promoting the conversion of both HC and CO gaseous pollutants and some proportion of the particulate matter through oxidation of these pollutants to carbon dioxide and water. Such catalysts have generally been contained in units called diesel oxidation catalysts ("DOC"), which are placed in the exhaust of diesel engines to treat the exhaust before it vents to the atmosphere. In addition to the conversions of gaseous HC, CO and particulate matter, oxidation catalysts that contain platinum group metals (which are typically dispersed on a refractory oxide support) promote the oxidation of nitric oxide (NO) to $NO_2$.

The total particulate matter emissions of diesel exhaust are comprised of three main components. One component is the solid, dry, solid carbonaceous fraction or soot fraction. This dry carbonaceous matter contributes to the visible soot emissions commonly associated with diesel exhaust. A second component of the particulate matter is the soluble organic fraction ("SOF"). The soluble organic fraction is sometimes referred to as the volatile organic fraction ("VOF"), which terminology will be used herein. The VOF can exist in diesel exhaust either as a vapor or as an aerosol (fine droplets of liquid condensate) depending on the temperature of the diesel exhaust. It is generally present as condensed liquids at the standard particulate collection temperature of 52° C. in diluted exhaust, as prescribed by a standard measurement test, such as the U.S. Heavy Duty Transient Federal Test Procedure. These liquids arise from two sources: (1) lubricating oil swept from the cylinder walls of the engine each time the pistons go up and down; and (2) unburned or partially burned diesel fuel.

The third component of the particulate matter is the so-called sulfate fraction. The sulfate fraction is formed from small quantities of sulfur components present in the diesel fuel. Small proportions of $SO_3$ are formed during combustion of the diesel, which in turn combines rapidly with water in the exhaust to form sulfuric acid. The sulfuric acid collects as a condensed phase with the particulates as an aerosol, or is adsorbed onto the other particulate components, and thereby adds to the mass of the total particulate matter.

One aftertreatment technology in use for high particulate matter reduction is the diesel particulate filter. There are many known filter structures that are effective in removing particulate matter from diesel exhaust, such as honeycomb wall flow filters, wound or packed fiber filters, open cell foams, sintered metal filters, etc. However, ceramic wall flow filters, described below, receive the most attention. These filters are capable of removing over 90% of the particulate material from diesel exhaust. The filter is a physical structure for removing particles from exhaust, and the accumulating particles will increase the back pressure from the filter on the engine. Thus the accumulating particles have to be continuously or periodically burned out of the filter to maintain an acceptable back pressure.

Ammonia selective catalytic reduction (SCR) is a $NO_x$ abatement technology that will be used to meet strict $NO_x$ emission targets in diesel and lean-burn engines. In the ammonia SCR process, $NO_x$ (defined as the sum of $NO+NO_2$) is reacted with ammonia (or an ammonia precursor such as urea) to form dinitrogen ($N_2$) over a catalyst typically composed of base metals.

Catalyzed wall flow filters containing a catalyst that promotes SCR of $NO_x$ assume two functions: removal of the particulate component of the exhaust stream and conversion of the $NO_x$ component of the exhaust stream to $N_2$. SCR-coated wall flow filters that can achieve $NO_x$ reduction goals require a sufficient loading of SCR catalyst composition on the wall flow filter under the usual space constraints in a vehicle. The gradual loss of the catalytic effectiveness of the compositions that occurs over lifetime through exposure to certain deleterious components of the exhaust stream or high temperatures augments the need for higher catalyst loadings of the SCR catalyst composition. However, preparation of coated wall flow filters with higher catalyst loadings can lead to unacceptably high back pressure within the exhaust system. An increase in backpressure can have an adverse impact on fuel efficiency.

An additional aspect for consideration in coating the wall flow filter is the selection of the appropriate SCR catalyst composition. First, the catalyst composition must be thermally durable so that it maintains its SCR catalytic activity even after prolonged exposure to higher temperatures that are characteristic of filter regeneration. For example, combustion of the soot fraction of the particulate matter often leads to temperatures above 700° C. and higher. Such temperatures render many commonly used SCR catalyst compositions such as mixed oxides of vanadium and titanium less catalytically effective. Second, the SCR catalyst compositions preferably have a wide enough operating temperature range so that they can accommodate the variable temperature ranges over which the vehicle operates. Temperatures below 300° C. are typically encountered, for example, at conditions of low load, or at startup. The SCR catalyst compositions are preferably capable of catalyzing the reduction of the $NO_x$ component of the exhaust to achieve $NO_x$ reduction goals, even at lower exhaust temperatures, particularly when the SCR catalyst is disposed on a filter substrate such as a wall flow filter. In general the SCR catalyst should have a high specific activity combined with a high hydrothermally stability.

Wall flow filters containing SCR catalysts and coating techniques have been proposed that allow higher SCR catalyst loadings on the wall flow filter, yet still allow the filter to maintain flow characteristics that achieve acceptable back pressures. Despite such proposed wall flow filters and coating techniques having higher SCR catalyst loadings, it would be desirable to provide wall flow filters and systems having lower catalyst loadings that permit management of backpressure and the catalytic function of the SCR catalyst. In addition, it would be desirable to provide catalytic articles, systems and methods that utilize particulate filters coated with an SCR catalyst at a loading that also achieves sufficient lower temperature $NO_x$ conversion when the exhaust gas stream passes through the filter, as well as exhibiting desirable hydrothermal aging characteristics.

SUMMARY OF THE INVENTION

One embodiment of the present invention relates to an emissions treatment system for treating an engine exhaust gas stream containing $NO_x$ and particulate matter. In one embodiment, an emissions treatment system for treating an engine exhaust gas stream containing an initial $NO_x$ concentration and particulate matter, the system providing a system back pressure and a system $NO_x$ conversion, the system comprises a particulate filter comprising a first SCR catalyst effective for $NO_x$ conversion disposed downstream of a reductant injector and having a loading in the range of about 0.1 $g/in^3$ and 2.5 $g/in^3$ with no intervening SCR catalysts disposed between the engine and the particulate filter; and a flow through substrate loaded with a second SCR catalyst effective for $NO_x$ conversion disposed downstream of the particulate filter, the particulate filter catalyst loading effective to provide a system back pressure that is less than about 25% greater than system back pressure associated with a similar system including a filter not loaded with catalyst and the system $NO_x$ cycle conversion is in the range of about 50% and 100%.

The system may further comprise an oxidation catalyst disposed upstream of the particulate filter. As an alternative, the system may comprise an oxidation catalyst disposed downstream of the particulate filter.

The treatment system may be operative to provide an intermediate $NO_x$ concentration after the gas stream passes through the particulate filter and a final $NO_x$ concentration after the gas stream passes through the substrate, and wherein the system $NO_x$ conversion based on the initial $NO_x$ concentration and the final $NO_x$ concentration and an increase in system back pressure lies within an operational window based on a minimum targeted system $NO_x$ conversion and a maximum targeted percentage increase in system back pressure.

The system may provide a variety of minimum targeted system $NO_x$ conversion, for example, about 60% and a maximum targeted percentage increase in system back pressure is about 25%.

In one or more embodiments, the particulate filter is a honeycomb wall flow filter comprising a plurality of longitudinally extending walls and at least about 70% by volume of the first SCR catalyst is located within the walls of the particulate filter. In one or more embodiments, at least about 80% by volume of the first SCR catalyst is located within the walls of the particulate filter. In an embodiment, at least about 90% by volume of the first SCR catalyst is located within the walls of the particulate filter.

In one or more embodiments, the filter comprises a high efficiency filter which removes at least about 70% of the particulate matter in the gas stream. In some embodiments, the particulate filter is a high efficiency filter which removes at least about 80% of the particulate matter in the gas stream.

The particulate filter may have a porosity in the range of about 40% and 90%, or in the range of about 40% and 80%, or in the range of about 40% and 70%.

In one or more embodiments, the first SCR catalyst is coated on an axial length of the particulate filter that is less than the total axial length of the filter.

In one or more embodiments, conversion of $NO_x$ passing through the particulate filter is in the range of about 10% and 90% of the system $NO_x$ conversion.

In certain embodiments, the first SCR catalyst comprises a material that provides a $NO_x$ conversion at the first SCR catalyst of at least about 25% at 250° C. for an exhaust gas stream at a space velocity of about 80,000 $h^{-1}$ when the gas stream comprises about 500 ppm NO, about 500 ppm $NH_3$ and about 5% water in air. In a specific embodiment, the first SCR catalyst comprises a material that provides a $NO_x$ conversion at the first SCR catalyst of at least about 30% at 250° C. as measured at steady state at a space velocity of about 80,000 $h^{-1}$.

In one embodiment, the first SCR catalyst comprises a zeolite containing Cu and having a CHA structure. In one embodiment, the second SCR catalyst comprises a zeolite containing Cu having a CHA structure.

In other embodiments, the first SCR catalyst comprises a mixed oxide of $V_2O_5$, $WO_3$ and $TiO_2$. The second SCR catalyst may comprise a mixed oxide of $V_2O_5$, $WO_3$ and $TiO_2$. In one or more embodiments, the first SCR catalyst comprises a Fe containing zeolite. In one or more embodiments, the second SCR catalyst comprises a Fe containing zeolite.

In one embodiment, the first SCR catalyst and the second SCR catalyst are the same. In other embodiments, the first SCR catalyst and the second SCR catalyst are different, the first SCR catalyst being operable for $NO_x$ conversion at higher gas stream temperatures and the second SCR catalyst being operable for $NO_x$ conversion at lower gas stream temperatures. The second SCR catalyst in such embodiments may comprise a zeolite containing Cu and having the CHA structure.

Another aspect of the invention pertains to a method of treating an engine exhaust gas stream having an initial $NO_x$ concentration and effective for conversion of $NO_x$, comprising: defining an exhaust gas system operational window based on a minimum targeted system $NO_x$ conversion and a maximum targeted percentage increase in system back pressure, the percentage increase in system back pressure based on a comparison of system back pressure associated with a filter not loaded with catalyst to a system with a filter loaded with catalyst; passing the gas stream through a particulate filter disposed downstream of the engine, the particulate filter loaded with a first SCR catalyst effective for $NO_x$ conversion, the gas stream having an intermediate $NO_x$ concentration after passing through the particulate filter, wherein there is no intervening SCR catalyst between the particulate filter and the engine, the exhaust gas stream containing a reductant comprising one or more of hydrocarbons, ammonia, urea and ammonia precursors; and passing the gas stream having the intermediate $NO_x$ concentration through a second substrate loaded with a second SCR catalyst disposed downstream of the particulate filter effective for $NO_x$ conversion, wherein the gas stream exiting the emissions treatment system has a final $NO_x$ concentration, and wherein the system $NO_x$ conversion and the system back pressure are within the operational window.

According to an embodiment of the method, the particulate filter is a honeycomb wall flow substrate which has a porosity in the range of about 50% and 80% and has a loading of SCR catalyst in the range of about 0.1 g/in$^3$ and 1.8 g/in$^3$. In one method embodiment, the system NO$_x$ conversion is in the range of about 50% and 100% of the initial NO$_x$ concentration. In at least one method embodiment, the conversion of NO$_x$ by the particulate filter is in the range of about 10% to about 90% of the system NO$_x$ conversion. In one method embodiment, the minimum targeted system NO$_x$ conversion is about 60% and the maximum targeted percentage increase in system back pressure is about 25%. In one method embodiment, the first SCR catalyst is coated on an axial length of the particulate filter that is less than the total axial length of the filter.

The foregoing has outlined rather broadly certain features and technical advantages of the present invention. It should be appreciated by those skilled in the art that the specific embodiments disclosed may be readily utilized as a basis for modifying or designing other structures or processes within the scope of the present invention. It should also be realized by those skilled in the art that such equivalent constructions do not depart from the spirit and scope of the invention as set forth in the appended claims.

DETAILED DESCRIPTION

Aspects of the invention relate to emissions treatment systems and methods for treating engine exhaust. In one embodiment, a system is provided that effectively provides simultaneous treatment of particulate matter, NO$_x$ and other gaseous components of diesel engine exhaust. The emission treatment system according to this embodiment utilizes an integrated particulate filter and SCR catalyst and a downstream SCR catalyst on a substrate. Balancing of the increase in backpressure due to the system catalysts and NOx conversion can be achieved by reduced loading of the particulate filter and selection of the SCR catalyst composition. Such a system represents an optimal space utilization below the vehicle in terms of backpressure, catalyst volumes and SCR conversion for a given specific SCR activity of the catalyst and the desired regulatory emission targets.

In one embodiment, integration of NO$_x$ reduction and particulate removal functions into a single catalyst article is accomplished using a particulate filter in the form of a wall flow substrate coated with an SCR catalyst composition. Achieving practical levels of SCR catalyst composition on the wall flow substrate is important for providing sufficient catalytic activity to achieve mandated NO$_x$ reduction levels, and for lowering the combustion temperature of the soot fraction trapped on the filter. Achieving adequate levels of SCR washcoat compositions on the soot filter is also important to secure adequate durability for the catalyst during hydrothermal aging. In addition, over extended use of the emissions treatment system, catalysts are invariably exposed to various levels of catalyst poisons that may be derived through break down of lubricating oils, or may arise from impurities in the diesel fuel. Examples of such catalyst poisons include phosphorus, zinc, alkali metals and alkaline earth metals. Higher levels of catalyst compositions are therefore typically deposited on catalyst substrates to overcome the inevitable loss of catalytic activity.

Figure 1A:
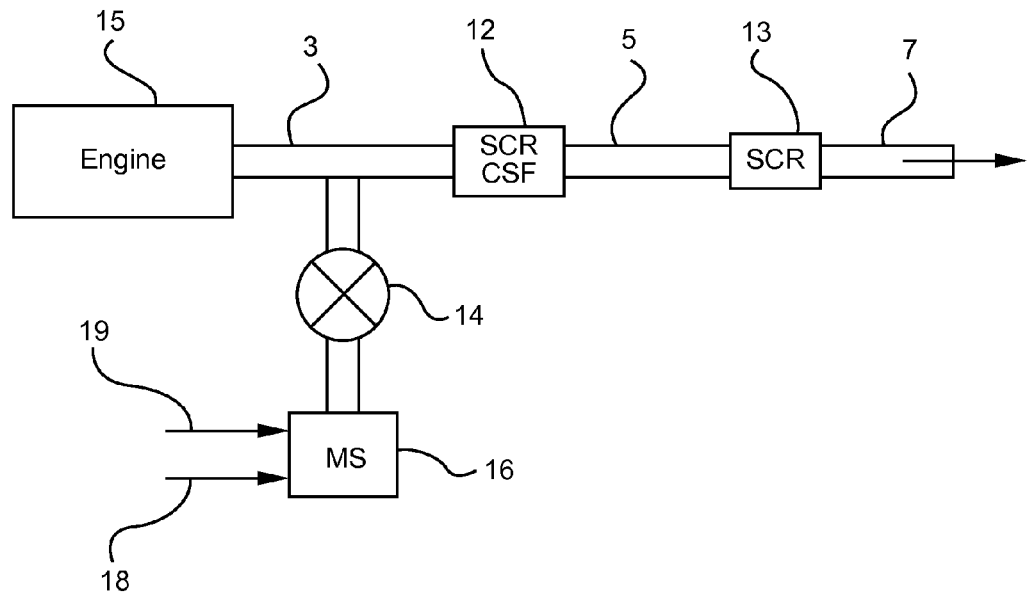
FIG. 1A is a schematic depiction of an emissions treatment system according to an embodiment of the present invention.

One embodiment of the inventive emission treatment system is schematically depicted in FIG. 1A. As seen, the exhaust gas stream containing gaseous pollutants (including unburned hydrocarbons, carbon monoxide and NO$_x$) and particulate matter from the engine 15 is introduced into the system. A reductant such as hydrocarbons, ammonia or any ammonia precursor (e.g., urea) or any other material showing a sufficient high reduction potential to facilitate the SCR reaction is injected as a spray via an injector in the form of a nozzle (not shown) into the exhaust stream. Aqueous urea shown on one line 18 can serve as an ammonia precursor which can be mixed with air on another line 19 in an injector including a mixing station 16. Injector can also include a valve 14, which can be used to meter precise amounts of aqueous urea which are converted in the exhaust stream to ammonia. The exhaust stream with the added reductant is conveyed to the particulate filter 12 containing a first SCR catalyst. On passing through the particulate filter 12, the NO$_x$ component is converted through the selective catalytic reduction of NO$_x$ with ammonia to nitrogen. There is no intervening SCR catalyst disposed between the engine 15 and the particulate filter 12.

The particulate matter including the soot fraction and the VOF are also largely removed (greater than 80%) by the particulate filter 12. The particulate matter deposited on the particulate filter 12 is combusted through the regeneration of the filter Upon exiting the particulate filter 12, the gas stream then passes through a substrate 13 containing a second SCR catalyst. The substrate 13 may be a flow through substrate and is disposed downstream of the particulate filter 12. The gas stream exiting the engine 15 contains an initial NO$_x$ concentration at location 3 before entering the particulate filter 12, an intermediate NO$_x$ concentration at location 5 between the particulate filter 12 and the downstream substrate 13, and a final NO$_x$ concentration at location 7 after passing through the flow through substrate 13. System conversion of NO$_x$ attained in the gas stream based on the initial NO$_x$ concentration and the final NO$_x$ concentration is greater than about 50%. The NO$_x$ conversion by the particulate filter 12 is in the range of about 10% to about 90% of the system NO$_x$ conversion integrally measured over a driving cycle (such as FTP 75 or under simulated reactor conditions). As used in this specification and in the claims, reference to NOx conversion and changes in system backpressure are made to steady state conversion (for example, as described in Examples 1 through 4), and transient testing under engine testing conditions (for example, as described in Example 5 HDD FTP).

According to an embodiment, the gas stream passing through the system described above causes the back pressure of the system to increase by less than about 75%, in specific embodiments, less than about 50%, and in more specific embodiments, less than about 25%. The system back pressure increase is determined relative to the back pressure increase resulting from passing the gas stream through an uncoated filter. System back pressure is measured by an average of cold flow values at a space velocity, equal to the volumetric flow rate of the gas stream divided by the system volume, of between 20,000 h$^{-1}$ and 120,000 h$^{-1}$.

An emissions treatment system according to an embodiment of the present invention allows for operation within a window defined by a minimum targeted system $NO_x$ concentration and a maximum targeted percentage increase in system back pressure. This operational window provides a range in which high $NO_x$ conversion may be realized without causing an excessive and highly undesirable back pressure increase. In one embodiment, the minimum targeted system NO conversion is about 60% and the maximum targeted percentage increase in system back pressure is about 25%. Other minimum targeted system $NO_x$ conversions and maximum targeted percentage increase in system back pressure can also be established in accordance with the present invention.

Suitable SCR catalyst compositions for use in the system are effective to catalyze the reduction of the $NO_x$ component at temperatures below 600° C., so that adequate $NO_x$ levels can be treated even under conditions of low load which typically are associated with lower exhaust temperatures. Preferably, the catalyst article is capable of converting at least 50% of the $NO_x$ component to $N_2$, depending on the amount of reductant added to the system. In addition, SCR catalyst compositions for use in the system are also ideally able to aid in the regeneration of the filter by lowering the temperature at which the soot fraction of the particulate matter is combusted. In certain embodiments of the system, the first SCR catalyst and/or the second SCR catalyst can comprise a zeolite containing Cu and having a CHA structure, a mixed oxide of $V_2O_5$, $WO_3$ and $TiO_2$, or a Fe doped zeolite. The compositions of the first SCR catalyst and the second SCR catalyst can be identical or different. If they are different, the first SCR catalyst is operable for $NO_x$ conversion at higher gas stream temperatures and the second SCR catalyst is operable for $NO_x$ conversion at lower gas stream temperatures. In addition, embodiments of the invention include combinations of different SCR active materials on different catalyst substrates or in a zone arrangement on a single substrate.

Useful SCR catalyst compositions used in the inventive system also have resistance to unacceptable degradation of catalytic activity at temperatures greater than 650° C. Such high temperatures are often encountered during the regeneration of particulate filters. SCR catalyst compositions should also resist degradation upon exposure to sulfur components, which are often present in diesel exhaust gas compositions. The first SCR catalyst is chosen to provide a system $NO_x$ conversion of at least about 25% at 250° C. and a space velocity of about 80,000 h$^{-1}$, under the test conditions referenced above. Preferably, the first SCR catalyst is chosen to provide a system $NO_x$ conversion of at least about 50% under these same conditions.

Suitable SCR catalyst compositions are described, for instance, in U.S. Pat. Nos. 4,961,917 (the '917 patent) and 5,516,497, which are both hereby incorporated by reference in their entirety. Compositions disclosed in the '917 patent include one or both of an iron and a copper promoter present in a zeolite in an amount of from about 0.1 to 30 percent by weight, preferably from about 1 to 5 percent by weight, of the total weight of promoter plus zeolite. In addition to their ability to catalyze the reduction of $NO_x$ with $NH_3$ to $N_2$, the disclosed compositions can also promote the oxidation of excess $NH_3$ with $O_2$, especially for those compositions having higher promoter concentrations.

Zeolites used in such compositions are resistant to sulfur poisoning, sustain a high level of activity for the SCR process, and are capable of oxidation of excess ammonia with oxygen. These zeolites have pore size large enough to permit adequate movement of the reactant molecules NO and $NH_3$ into, and the product molecules $N_2$ and $H_2O$ out of, the pore system in the presence of sulfur oxide molecules resulting from short term sulfur poisoning, and/or sulfate deposits resulting from long term sulfur poisoning. The pore system of suitable size is interconnected in all three crystallographic dimensions. As is well known to the those skilled in the zeolite art, the crystalline structure of zeolites exhibits a complex pore structure having more or less regularly recurring connections, intersections and the like. Pores having a particular characteristic, such as a given dimension diameter or cross-sectional configuration, are said to be one dimensional if those pores do not intersect with other like pores. If the pores intersect only within a given plane with other like pores, the pores of that characteristic are said to be interconnected in two (crystallographic) dimensions. If the pores intersect with other like pores lying both in the same plane and in other planes, such like pores are said to be interconnected in three dimensions, i.e., to be "three dimensional". It has been found that zeolites which are highly resistant to sulfate poisoning and provide good activity for both the SCR process and the oxidation of ammonia with oxygen, and which retain good activity even when subject to high temperatures, hydrothermal conditions and sulfate poisons, are zeolites which have pores which exhibit a pore diameter of at least about 7 Angstroms and are interconnected in three dimensions. Without wishing to be bound by any specific theory, it is believed that the interconnection of pores of at least 7 Angstroms diameter in three dimensions provides for good mobility of sulfate molecules throughout the zeolite structure, thereby permitting the sulfate molecules to be released from the catalyst to free a large number of the available adsorbent sites for reactant $NO_x$ and $NH_3$ molecules and reactant $NH_3$ and $O_2$ molecules. Any zeolites meeting the foregoing criteria are suitable for use in the practices of the present invention; specific zeolites which meet these criteria are USY, Beta and ZSM-20. Other metal ion exchanged zeolites may also satisfy the aforementioned criteria.

Particular zeolite compositions that may be used in accordance with one or more embodiments of the invention include zeolites having the CHA crystal structure. The CHA zeolite may contain copper. Exemplary CHA zeolites have a silica to alumina ratio (SAR) greater than about 15, and copper content exceeding about 0.2 wt %. In a more specific embodiment, the mole ratio of silica to alumina is from about 15 to about 256, and copper content from about 0.2 wt % to about 5 wt %. Other useful compositions for SCR include non-zeolitic molecular sieves having the CHA crystal structure. For example, silicoaluminophosphates such as SAPO-34, SAPO-44 and SAPO-18 may be used in accordance with one or more embodiments.

When deposited on the wall flow monolith substrates, such SCR catalyst compositions are deposited at concentrations in the range of about 0.1 g/in³ 1.3 g/in³ to ensure that the desired $NO_x$ reduction and particulate removal levels are achieved and to secure adequate durability of the catalyst over extended use. The use of specific catalysts, for example a zeolite having the CHA structure and containing copper are particularly useful in providing wall flow substrates having loadings in the range of about 0.1 g/in³ to 2.5 g/in³, in specific embodiments in the range of about 0.1 g/in³ to 1.8 g/in³, and in more specific embodiments in the range of about 0.1 g/in³ to 1.3 g/in³. Suitable upper ends of the loading include 1.9 g/in³, 2.0 g/in³, 2.1 g/in³, 2.2 g/in³, 2.3 g/in³, 2.4 g/in³.

Figure 1B:
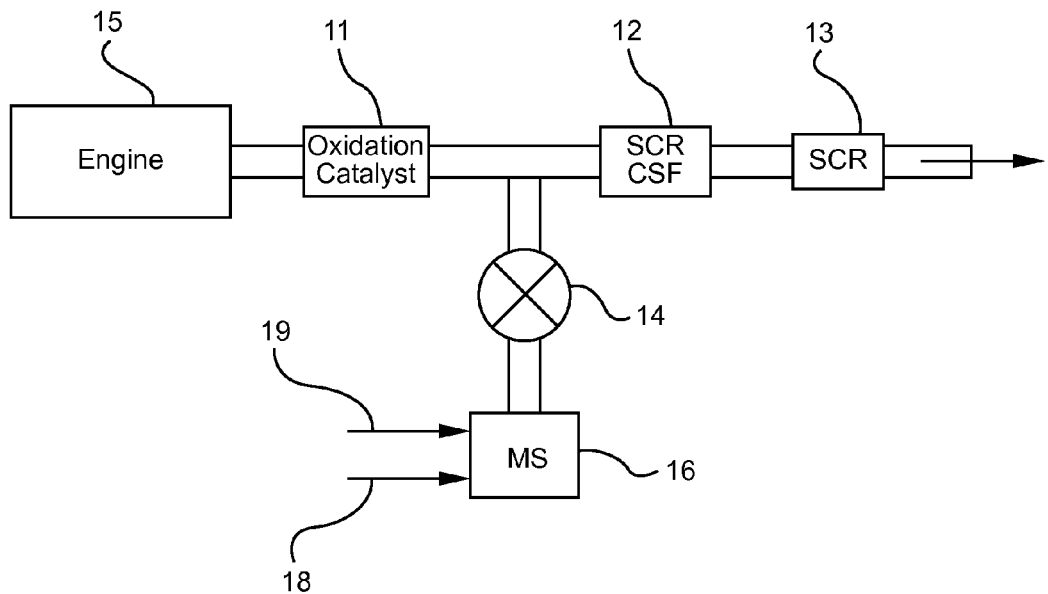
FIG. 1B is a schematic depiction of an emissions treatment system according to a second embodiment of the present invention.

A second embodiment of an emissions treatment system is illustrated in FIG. 1B, which is similar to the system shown in FIG. 1A. The system in FIG. 1B includes an oxidation catalyst 11 located upstream of the particulate filter 12. In the oxidation catalyst 11, unburned gaseous and non-volatile hydrocarbons (i.e., the VOF) and carbon monoxide are largely combusted to form carbon dioxide and water. Removal of substantial proportions of the VOF using the oxidation catalyst, in particular, helps prevent too great a deposition of particulate matter on the particulate filter 12 (i.e., clogging), which is positioned downstream in the system. In addition, a substantial proportion of the NO of the $NO_x$ component is oxidized to $NO_2$ in the oxidation catalyst. The increased proportion of $NO_2$ in the $NO_x$ due to the catalytic action of the upstream oxidation catalyst facilitates the reduction of the $NO_x$ as compared to exhaust streams containing smaller proportions of $NO_2$ in the $NO_x$ component.

The oxidation catalyst 11 can be formed from any composition that provides effective combustion of unburned gaseous and non-volatile hydrocarbons (i.e., the VOF) and carbon monoxide. In addition, the oxidation catalyst should be effective to convert a substantial proportion of the NO of the $NO_x$ component to $NO_2$. As used herein, the term "substantial conversion of NO of the $NO_x$ component to $NO_2$ means at least 5%, at least 10%, at least 15%, at least 20%, at least 20%, at least 25%, at least 30%, at least 35%, at least 40%, and more specifically in the range of about 30% and 50%, and in some embodiments, up to about 60% conversion at a temperature of at least 200° C. Catalyst compositions having these properties are known in the art, and include platinum group metal- and base metal-based compositions. The catalyst compositions can be coated onto honeycomb flow-through monolith substrates formed of refractory metallic or ceramic (e.g., cordierite) materials. Alternatively, oxidation catalysts may be formed on to metallic or ceramic foam substrates which are well-known in the art. These oxidation catalysts, by virtue of the substrate on which they are coated (e.g., open cell ceramic foam), and/or by virtue of their intrinsic oxidation catalytic activity provide some level of particulate removal. Preferably, the oxidation catalyst removes some of the particulate matter from the exhaust stream upstream of the wall flow filter, since the reduction in the particulate mass on the filter potentially extends the time before forced regenerations.

One suitable oxidation catalyst composition that may be used in the emission treatment system contains a platinum group component (e.g., platinum, palladium or rhodium components) dispersed on a high surface area, refractory oxide support (e.g., gamma-alumina) which is combined with a zeolite component (preferably a beta zeolite). A suitable platinum group metal component is platinum. When the composition is disposed on a refractory oxide substrate, e.g., a flow through honeycomb substrate, the concentration of platinum is typically from about 10 to 120 g/ft³ of platinum.

Platinum group metal-based compositions suitable for use in forming the oxidation catalyst are also described in U.S. Pat. No. 5,100,632 (the '632 patent) hereby incorporated by reference. The '632 patent describes compositions that have a mixture of platinum, palladium, rhodium, and ruthenium and an alkaline earth metal oxide such as magnesium oxide, calcium oxide, strontium oxide, or barium oxide with an atomic ratio between the platinum group metal and the alkaline earth metal of about 1:250 to about 1:1, and particularly about 1:60 to about 1:6.

Catalyst compositions suitable for the oxidation catalyst may also be formed using base metals as catalytic agents. For example, U.S. Pat. No. 5,491,120 (the disclosure of which is hereby incorporated by reference) discloses oxidation catalyst compositions that include a catalytic material having a BET surface area of at least about 10 m²/g and consist essentially of a bulk second metal oxide which may be one or more of titania, zirconia, ceria-zirconia, silica, alumina-silica, and alpha-alumina.

Also useful are the catalyst compositions disclosed in U.S. Pat. No. 5,462,907 (the '907 patent, the disclosure of which is hereby incorporated by reference). The '907 patent teaches compositions that include a catalytic material containing ceria and alumina each having a surface area of at least about 10 m²/g, for example, ceria and activated alumina in a weight ratio of from about 1.5:1 to 1:1.5. Optionally, platinum may be included in the compositions described in the '907 patent in amounts effective to promote gas phase oxidation of CO and unburned hydrocarbons but which are limited to preclude excessive oxidation of SO to $SO_2$. Alternatively, palladium in any desired amount may be included in the catalytic material.

Wall flow substrates useful for supporting the SCR catalyst compositions according to embodiments of the invention have a plurality of fine, substantially parallel gas flow passages extending along the longitudinal axis of the substrate. Typically, each passage is blocked at one end of the substrate body, with alternate passages blocked at opposite end-faces. Such monolithic carriers may contain up to about 700 or more flow passages (or "cells") per square inch of cross section, although far fewer may be used. For example, the carrier may have from about 7 to 600, more usually from about 100 to 400, cells per square inch ("cpsi"). The cells can have cross sections that are rectangular, square, circular, oval, triangular, hexagonal, or are of other polygonal shapes. Wall flow substrates typically have a wall thickness between 0.002 and 0.1 inches. Suitable wall flow substrates have wall thicknesses of between 0.002 and 0.015 inches.

Figure 2:
FIG. 2 is a perspective view of a wall flow filter substrate.
Figure 3:
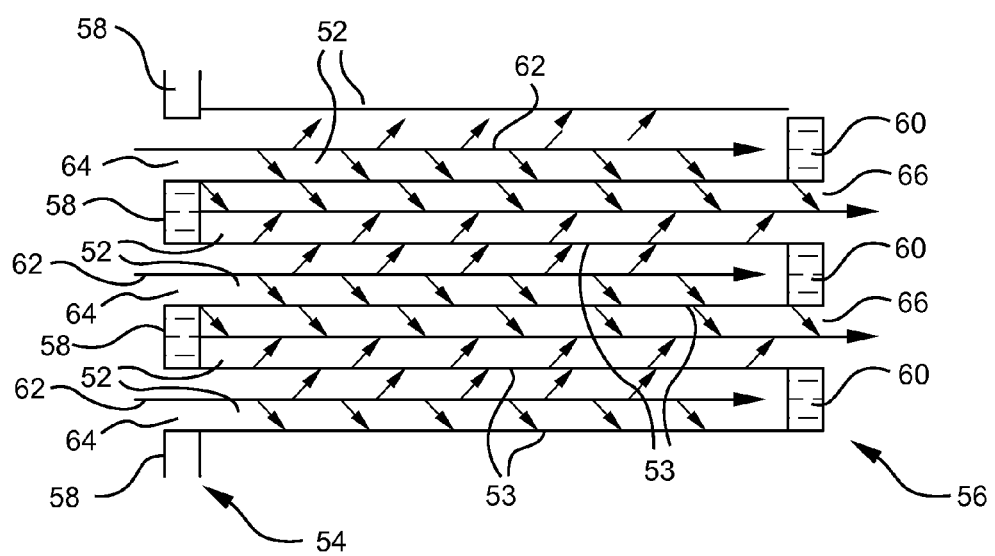
FIG. 3 is a cross sectional view of a section of a wall flow filter substrate.

FIGS. 2 and 3 illustrate a wall flow filter substrate 30 which has a plurality of passages 52. The passages are tubularly enclosed by the internal walls 53 of the filter substrate. The substrate has an inlet end 54 and an outlet end 56. Alternate passages are plugged at the inlet end with inlet plugs 58, and at the outlet end with outlet plugs 60 to form opposing checkerboard patterns at the inlet 54 and outlet 56. A gas stream 62 enters through the unplugged channel inlet 64, is stopped by outlet plug 60 and diffuses through channel walls 53 (which are porous) to the outlet side 66. The gas cannot pass back to the inlet side of walls because of inlet plugs 58.

Suitable wall flow filter substrates are composed of ceramic-like materials such as cordierite, alpha.-alumina, silicon carbide, silicon nitride, zirconia, mullite, spodumene, alumina-silica-magnesia or zirconium silicate, or of porous, refractory metal. Wall flow substrates may also be formed of ceramic fiber composite materials. Suitable wall flow substrates are formed from cordierite and silicon carbide. Such materials are able to withstand the environment, particularly high temperatures, encountered in treating the exhaust streams. The wall flow filter may be coated with SCR catalyst for it entire axial length, or a portion of the total axial length of the filter in a zone coated configuration.

Suitable wall flow substrates for use in the inventive system include thin porous walled honeycombs (monoliths) through which the fluid stream passes without causing too great an increase in back pressure or pressure across the article. Normally, the presence of a clean wall flow article will create a back pressure of 1 inch water column to 10 psig. In an embodiment, ceramic wall flow substrates used in the system are formed of a material having a porosity of at least 40% or 45% (e.g., from 40% to 80%) having a mean pore size of at least 5 microns (e.g., from 5 to 30 microns). In specific embodiments, such materials have a porosity of at least 50% (e.g., from 50% to 80%). The porosity of the material that forms the walls can be defined by density of the wall versus the theoretical density of material. In specific embodiments, the substrates have a porosity of at least 55% and have a mean pore size of at least 10 microns. When substrates with these porosities and these mean pore sizes are coated with the techniques described below, adequate levels of SCR catalyst compositions can be loaded onto the substrates to achieve excellent $NO_x$ conversion efficiency. These substrates are still able retain adequate exhaust flow characteristics, i.e., acceptable back pressures, despite the SCR catalyst loading. U.S. Pat. No. 4,329,162 is herein incorporated by reference with respect to the disclosure of suitable wall flow substrates. The particulate filter 12 can also be a high efficiency filter which removes at least about 70% of the particulate matter in the gas stream.

Typical wall flow filters in commercial use are typically formed with lower wall porosities, e.g., from about 35% to 50%, than the wall flow filters utilized in the invention. In general, the pore size distribution of commercial wall flow filters is typically very broad with a mean pore size smaller than 17 microns.

The porous wall flow filter used in this invention is catalyzed in that the wall of said element has thereon or contained therein one or more catalytic materials. Catalytic materials may be present on the inlet side of the element wall alone, the outlet side alone, both the inlet and outlet sides, or the wall itself may consist all, or in part, of the catalytic material. This invention includes the use of one or more layers of catalytic materials and combinations of one or more layers of catalytic materials on the inlet and/or outlet walls of the element. In one embodiment of the emissions treatment system, the first SCR catalyst is located within the walls of the particulate filter 12 in the range of about 70%-100% by volume.

To coat the wall flow substrates with the SCR catalyst composition, the substrates are immersed vertically in a portion of the catalyst slurry such that the top of the substrate is located just above the surface of the slurry. In this manner slurry contacts the inlet face of each honeycomb wall, but is prevented from contacting the outlet face of each wall. The sample is left in the slurry for about 30 seconds. The substrate is removed from the slurry, and excess slurry is removed from the wall flow substrate first by allowing it to drain from the channels, then by blowing with compressed air (against the direction of slurry penetration), and then by pulling a vacuum from the direction of slurry penetration. By using this technique, the catalyst slurry permeates the walls of the substrate, yet the pores are not occluded to the extent that undue back pressure will build up in the finished substrate. As used herein, the term "permeate" when used to describe the dispersion of the catalyst slurry on the substrate, means that the catalyst composition is dispersed throughout the wall of the substrate.

The coated substrates are dried typically at about 100° C. and calcined at a higher temperature (e.g., 300° C. to 450° C.). After calcining, the catalyst loading can determined be through calculation of the coated and uncoated weights of the substrate. As will be apparent to those of skill in the art, the catalyst loading can be modified by altering the solids content of the coating slurry. Alternatively, repeated immersions of the substrate in the coating slurry can be conducted, followed by removal of the excess slurry as described above.

EXAMPLES

Example 1

SCR Coating on a Wall Flow Filter Substrate

SCR catalyst was loaded on a 65% porosity cordierite filter core measuring 1" diameter by 3" length. Thus, a metal exchanged alumino silicate zeolite having a CHA structure, ie Cu SSZ13, catalyst powder was mixed with water and milled so that 90% of the particles had a diameter of less than 5 microns (i.e. D90<5 μ). The resulting slurry was diluted to 24% solids by weight. The filter core was dipped into the slurry until it was completely immersed and then removed to drain the excess slurry followed by blowing with compressed air to remove slurry from the walls. After all the excess slurry was removed from the walls and the channels, the part was dried under flowing air at 120° C. for 30 mins. The dried sample was then calcined in static air for 1 h at 450° C. The resulting catalyst loading on the part was 1.22 g/in3. Pressure drop measurements were taken prior to and after coating using a Superflow bench. The flow was measured at 4, 6, 8, 10, 12, and 15" of water prior to coating and again after coating. The reduction in flow was recorded and then averaged to give a single backpressure increase with coating of 9.53%. After coating, the sample was aged at 750° C. for 5 hrs under a flow of air with 10% steam. SCR performance of the coated sample was measured in a quartz lined reactor with a gas feed comprising 500 ppm NO, 500 ppm NH3, 5% H2O, 10% O2, and balance N2. The total flow gas flow through the sample was 22.5 L resulting in an hourly gas space velocity of approximately 37,000 hr-1. The sample's SCR catalytic activity was tested by stabilizing at 200° C. for 15 mins and then measuring the downstream NO, a NO2, N2O and NH3 gas concentrations with an FTIR. The gas concentrations were then taken at 250, 300, 350, and 450° C. in the same manner. The sample's "NOx" conversion was thus recorded as a % reduction in NO concentration at each temperature point and is given in table 1 below.

TABLE 1

| NOx conversion of SCR on a 65% porosity cordierite filter | | | | | |
|---|---|---|---|---|---|
| Temperature | 200 | 250 | 300 | 350 | 450 |
| NOx | 69.2 | 93.8 | 95.1 | 91.1 | 81.4 |

Example 2

Catalyst Loading Study of SCR on 65% Cordierite Wall Flow Filter Cores

Figure 4:
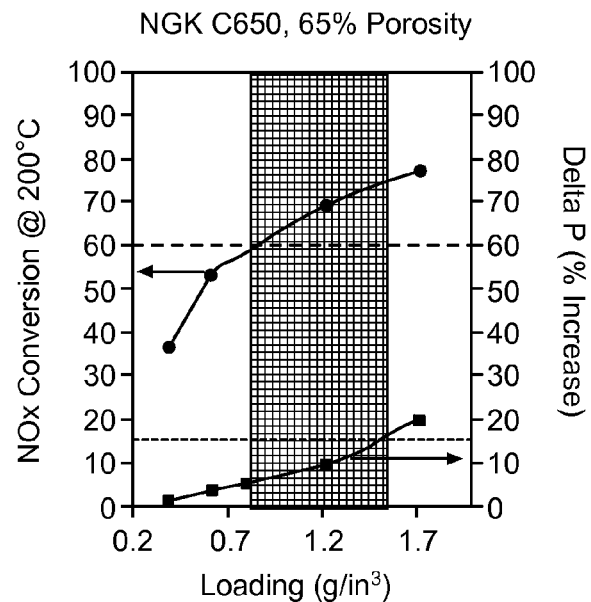
FIG. 4 is a graph showing results of the backpressure and NOx conversion at 200° C. for Example 2 as a function of catalyst loading and a targeted minimum backpressure and NOx conversion at 200° C. a targeted maximum value for backpressure increase of 15% as guidelines for the samples.

Using the methods of example 1, a series of samples was created by loading 65% porosity cordierite filter cores, 1"×3", with an SCR catalyst of Cu SSZ13 using different solids slurries. Thus, slurries containing 10 to 35% solids by weight were used to create samples with from 0.4 to 1.9 g/in3 catalyst loading. The backpressure increase and SCR catalytic performance were measured for each of the samples. The results of the backpressure and the NOx conversion at 200° C. are plotted in FIG. 4 as a function of catalyst loading for the series. FIG. 4 also shows the targeted minimum value for NOx conversion at 200° C. of 60% and a targeted maximum value for backpressure increase of 15% as guidelines for the samples. With these target values in mind, it is clear that at lower loadings, the SCR catalytic performance is below target while at high catalyst loadings the backpressure increase on coating is above target. The optimum catalyst loading range for best SCR operation with best back pressure is thus noted as the dashed box.

Example 3

Catalyst Loading Study of SCR on 60% Cordierite Filter Cores

Figure 5:
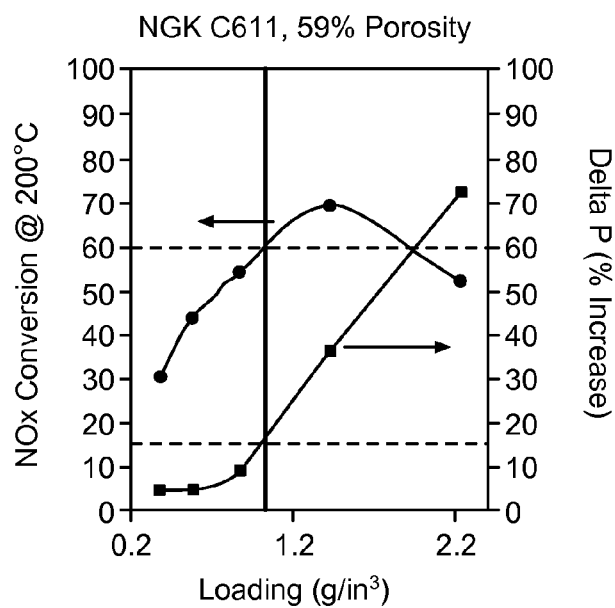
FIG. 5 is a graph showing the backpressure and the NOx conversion at 200° C. for Example 3 as a function of catalyst loading and the targeted minimum value for NOx conversion at 200° C. of 60% and a targeted maximum value for backpressure increase of 15% as guidelines for the samples.

Using the methods of example 1, a series of samples was created by loading 60% porosity cordierite filter cores, 1"×3", with an SCR catalyst of Cu SSZ13 using different solids slurries. Thus, slurries containing 10 to 30% solids by weight were used to create samples with from 0.4 to 2.2 g/in3 catalyst loading. The backpressure increase and SCR catalytic performance was measured for each of the samples. The results of the backpressure and the NOx conversion at 200° C. are plotted in FIG. 5 as a function of catalyst loading for the series. FIG. 5 also shows the targeted minimum value for NOx conversion at 200° C. of 60% and a targeted maximum value for backpressure increase of 15% as guidelines for the samples. With these target values in mind, it is clear that at lower loadings, the SCR catalytic performance is below target while at high catalyst loadings the backpressure increase on coating is above target. The optimum catalyst loading range for best SCR operation with best back pressure is thus noted as the dashed line which is a much smaller range than the previous example #2.

Example 4

Catalyst Loading Study of SCR on 60% Sic Filter Cores

Figure 6:
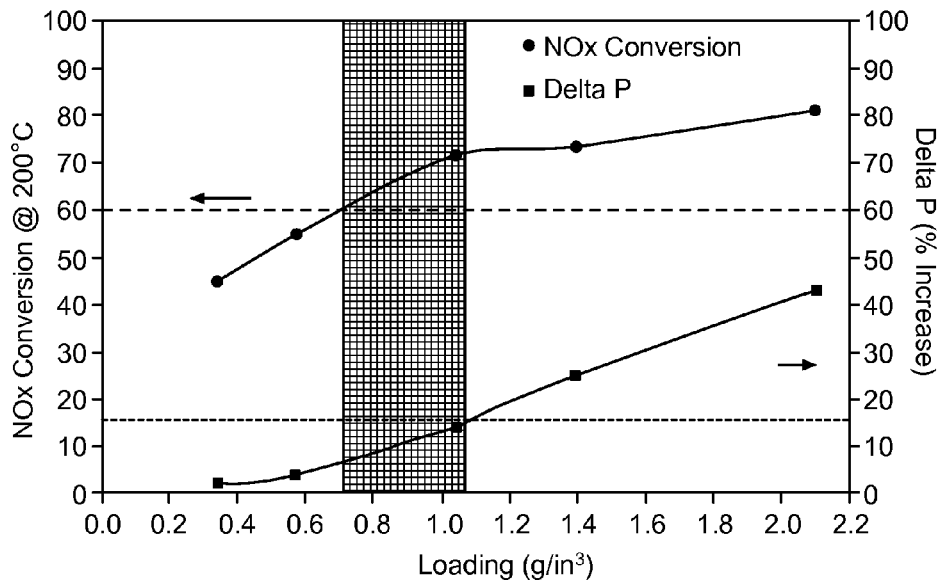
FIG. 6 is a graph showing the results of the backpressure and the NOx conversion at 200° C. for Example 4 as a function of catalyst loading for the series and the targeted minimum value for NOx conversion at 200° C. of 60% and a targeted maximum value for backpressure increase of 15% as guidelines for the samples.

Using the methods of example 1, a series of samples was created by loading 65% porosity cordierite filter cores, 1"×3", with an SCR catalyst of Cu SSZ13 using different solids slurries. Thus, slurries containing 10 to 30% solids by weight were used to create samples with from 0.34 to 2.1 g/in3 catalyst loading. The backpressure increase and SCR catalytic performance was measured for each of the samples. The results of the backpressure and the NOx conversion at 200° C. are plotted in FIG. 6 as a function of catalyst loading for the series. FIG. 6 also shows the targeted minimum value for NOx conversion at 200° C. of 60% and a targeted maximum value for backpressure increase of 15% as guidelines for the samples. With these target values in mind, it is clear that at lower loadings, the SCR catalytic performance is below target while at high catalyst loadings the backpressure increase on coating is above target. The optimum catalyst loading range for best SCR operation with best back pressure is thus noted as the dashed box.

Example 5

Engine Testing of a SCR on Filter Plus Downstream SCR System

Figure 7:
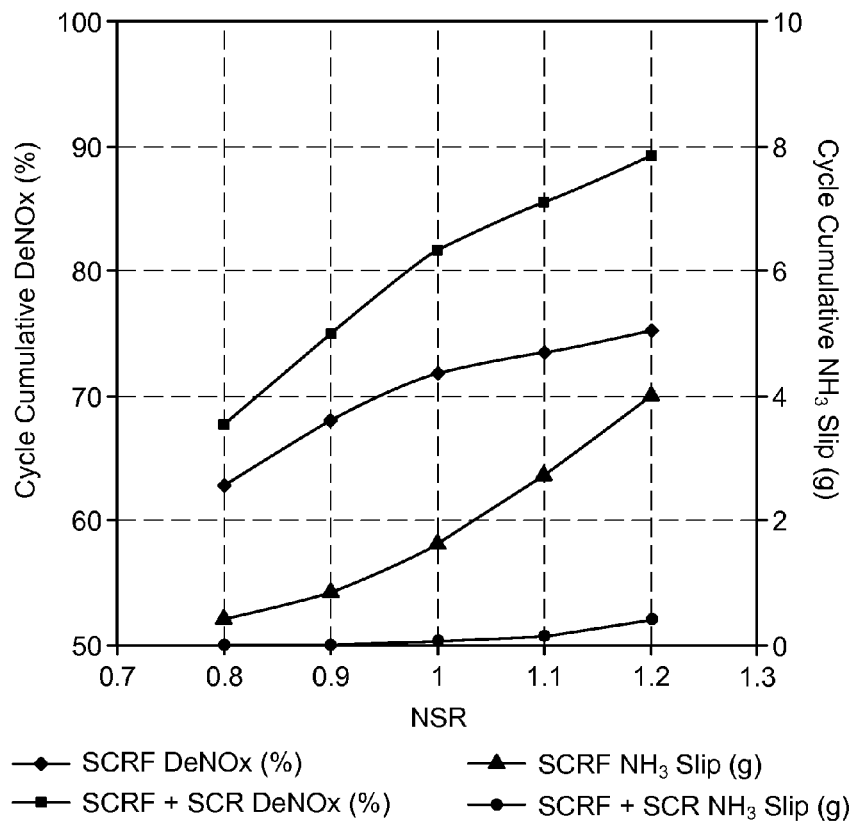
FIG. 7 is a graph showing the results of cumulative cycle NOx conversion and cumulative cycle NH3 slip as a function of NSR for Example 5.

SCR catalyst comprising an Fe Beta zeolite was loaded into a 9"×10" cordierite wall flow filter substrate of nominally 60% porosity using the methods of example #1. The loading of the SCR catalyst was 1.7 g/in$^3$. The SCR catalyst on filter (SCRF) plus SCR on flow through system was tested in an engine test cell so that the engine exhaust was directed through a DOC followed by the SCRF and then the SCR catalyst. The system was tested across the standard Federal Test Protocol (FTP) cycle. The NO, $NO_2$, and $NH_3$ concentrations were measured before the SCRF (noted as engine out emissions), after the SCRF and after the SCR (or tail pipe emissions). Thus, the NOx conversion across the SCRF and the SCRF plus SCR could both be calculated. The FTP test was repeated at a series of injected NH3/engine out NOx ratios (NSR) of 0.8 to 1.2. FIG. 7 shows the results of cumulative cycle NOx conversion and cumulative cycle NH3 slip as a function of NSR. The NOx conversion over the SCRF component ranges from approximately 64% at an NSR of 0.8 to approximately 75% at an NSR of 1.2. The NOx conversion of the combination of the SCRF and the SCR over the same NSR range is from 68% to 89%. Additionally, the NH3 slip out of the SCRF increases from less than 0.5 g to 4 g over the cycle on increasing the NSR from 0.8 to 1.2 but the NH3 slip out of the SCRF+SCR goes from 0 to approximately 0.25 g over the same range. This shows that the SCRF part by itself is unable to completely convert all of the NOx coming from the engine but the combination of the two components, SCRF plus SCR is able to remove the NOx to acceptable levels while avoiding additional NH3 slip.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments. The order of description of the above method should not be considered limiting, and methods may use the described operations out of order or with omissions or additions.

It is to be understood that the above description is intended to be illustrative, and not restrictive. Many other embodiments will be apparent to those of ordinary skill in the art upon reviewing the above description. The scope of the invention should, therefore, be determined with reference to the appended claims, along with the full scope of equivalents to which such claims are entitled.

The invention claimed is:

1. An emissions treatment system for treating an engine exhaust gas stream containing an initial $NO_x$ concentration and particulate matter, the system providing a system back pressure and a system $NO_x$ conversion, the system comprising:
    a reductant injector;
    a honeycomb wall flow filter comprising a first SCR catalyst effective for $NO_x$ conversion disposed downstream of the reductant injector and having a loading in the range of about 0.1 g/in$^3$ and 2.5 g/in$^3$ with no intervening SCR catalysts disposed between the engine and the honeycomb wall flow filter; and
    a flow through substrate loaded with a second SCR catalyst effective for $NO_x$ conversion disposed downstream of the honeycomb wall flow filter, the honeycomb wall flow filter catalyst loading effective to provide a system back pressure that is less than about 25% greater than system back pressure associated with a similar system including a filter not loaded with catalyst and the system $NO_x$ conversion is in the range of about 50% and 100%.

2. The emissions treatment system of claim 1, further comprising an oxidation catalyst disposed downstream of the honeycomb wall flow filter.

3. The emissions treatment system of claim 1, wherein the first SCR catalyst comprises a material that provides a $NO_x$ conversion at the first SCR catalyst of at least about 25% at 250° C. for an exhaust gas stream at a space velocity of about 80,000 $h^{-1}$ when the gas stream comprises about 500 ppm NO, about 500 ppm $NH_3$ and about 5% water in air.

4. The emissions treatment system of claim 1, further comprising an oxidation catalyst disposed upstream of the honeycomb wall flow filter.

5. The emissions treatment system of claim 4, wherein the treatment system is operative to provide an intermediate $NO_x$ concentration after the gas stream passes through the honeycomb wall flow filter and a final $NO_x$ concentration after the gas stream passes through the substrate, and wherein the system $NO_x$ conversion based on the initial $NO_x$ concentration and the final $NO_x$ concentration and an increase in system back pressure lies within an operational window based on a minimum targeted system $NO_x$ conversion and a maximum targeted percentage increase in system back pressure.

6. The emissions treatment system of claim 5, wherein the first SCR catalyst is coated on an axial length of the honeycomb wall flow filter that is less than the total axial length of the filter.

7. The emissions treatment system of claim 5, wherein conversion of $NO_x$ passing through the honeycomb wall flow filter is in the range of about 10% and 90% of the system $NO_x$ conversion.

8. The emissions treatment system of claim 7, wherein the first SCR catalyst comprises a material that provides a $NO_x$ conversion at the first SCR catalyst of at least about 30% at 250° C. as measured at steady state at a space velocity of about 80,000 $h^{-1}$.

9. The emissions treatment system of claim 5, wherein the second SCR catalyst comprises a mixed oxide of $V_2O_5$, $WO_3$ and $TiO_2$.

10. The emissions treatment system of claim 5, wherein the first SCR catalyst and the second SCR catalyst are the same.

11. The emissions treatment system of claim 5, wherein the first SCR catalyst and the second SCR catalyst are different, the first SCR catalyst being operable for $NO_x$ conversion at higher gas stream temperatures and the second SCR catalyst being operable for $NO_x$ conversion at lower gas stream temperatures.

12. The emissions treatment system of claim 11, wherein the second SCR catalyst comprises a zeolite containing Cu and having a CHA structure.

13. The emissions treatment system of claim 5, wherein the minimum targeted system $NO_x$ conversion is about 60% and the maximum targeted percentage increase in system back pressure is about 25%.

14. The emissions treatment system of claim 13, wherein the honeycomb wall flow filter comprises a plurality of longitudinally extending walls and at least about 70% by volume of the first SCR catalyst is located within the walls of the honeycomb wall flow filter.

15. The emissions treatment system of claim 14, wherein at least about 80% by volume of the first SCR catalyst is located within the walls of the honeycomb wall flow filter.

16. The emissions treatment system of claim 15, wherein at least about 90% by volume of the first SCR catalyst is located within the walls of the honeycomb wall flow filter.

17. The emissions treatment system of claim 13, wherein the honeycomb wall flow filter is a high efficiency filter which removes at least about 70% of the particulate matter in the gas stream.

18. The emissions treatment system of claim 17, wherein the honeycomb wall flow filter is a high efficiency filter which removes at least about 80% of the particulate matter in the gas stream.

19. The emissions treatment system of claim 13, wherein the honeycomb wall flow filter has a porosity in the range of about 40% and 90%.

20. The emissions treatment system of claim 19, wherein the honeycomb wall flow filter has a porosity in the range of about 40% and 80%.

21. The emissions treatment system of claim 20, wherein the honeycomb wall flow filter has a porosity in the range of about 40% and 70%.

22. The emissions treatment system of claim 13, wherein the first SCR catalyst comprises a zeolite containing Cu and having a CHA structure.

23. The emissions treatment system of claim 13, wherein the second SCR catalyst comprises a zeolite containing Cu having a CHA structure.

24. The emissions treatment system of claim 13, wherein the first SCR catalyst comprises a mixed oxide of $V_2O_5$, $WO_3$ and $TiO_2$.

25. The emissions treatment system of claim 13, wherein the first SCR catalyst comprises a Fe containing zeolite.

26. The emissions treatment system of claim 13, wherein the second SCR catalyst comprises a Fe containing zeolite.

27. A method of treating an engine exhaust gas stream having an initial $NO_x$ concentration and effective for conversion of $NO_x$, comprising:
defining an exhaust gas system operational window based on a minimum targeted system $NO_x$ conversion and a maximum targeted percentage increase in system back pressure, the percentage increase in system back pressure based on a comparison of system back pressure associated with a filter not loaded with catalyst to a system with a filter loaded with catalyst;
passing the gas stream through a honeycomb wall flow filter disposed downstream of the engine, the honeycomb wall flow filter loaded with a first SCR catalyst effective for $NO_x$ conversion, the gas stream having an intermediate $NO_x$ concentration after passing through the honeycomb wall flow filter, wherein there is no intervening SCR catalyst between the honeycomb wall flow filter and the engine, the exhaust gas stream containing a reductant comprising one or more of hydrocarbons, ammonia, urea and ammonia precursors; and
passing the gas stream having the intermediate $NO_x$ concentration through a second substrate loaded with a second SCR catalyst disposed downstream of the honeycomb wall flow filter effective for $NO_x$ conversion, wherein the gas stream exiting the emissions treatment system has a final $NO_x$ concentration, and wherein the system $NO_x$ conversion and the system back pressure are within the operational window.

28. The method of treating an engine exhaust gas stream of claim 27, wherein the honey comb wall flow filter has a porosity in the range of about 50% and 80% and has a loading of SCR catalyst in the range of about 0.1 $g/in^3$ and 1.8 $g/in^3$.

29. The method of claim 28, wherein the first SCR catalyst is coated on an axial length of the honeycomb wall flow filter that is less than the total axial length of the filter.

30. The method of treating an engine exhaust gas stream of claim 27, wherein the system $NO_x$ conversion is in the range of about 50% and 100% of the initial $NO_x$ concentration.

31. The method of treating an engine exhaust gas stream of claim 27, wherein conversion of $NO_x$ by the honeycomb wall flow filter is in the range of about 10% to about 90% of the system $NO_x$ conversion.

32. The method of treating an engine exhaust gas stream of claim 31, wherein the minimum targeted system $NO_x$ conversion is about 60% and the maximum targeted percentage increase in system back pressure is about 25%.

* * * * *